(No Model.)
C. K. BRADFORD.
BRUSH HOLDER AND TUBE FOR CEMENTING SHOE SOLES.
No. 292,466. Patented Jan. 29, 1884.
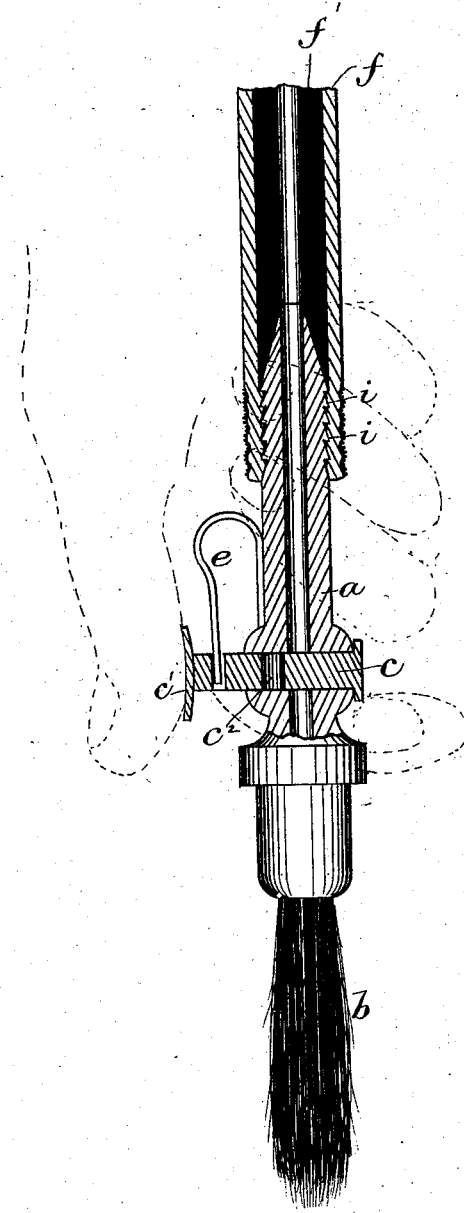
Witnesses.
A. L. White
C. P. Judd.
Inventor.
C. K. Bradford
by Wright H. Brown
Atty.

UNITED STATES PATENT OFFICE.

CHARLES K. BRADFORD, OF LYNNFIELD, ASSIGNOR TO GEORGE H. P. FLAGG, OF BOSTON, MASSACHUSETTS.

BRUSH-HOLDER AND TUBE FOR CEMENTING SHOE-SOLES.

SPECIFICATION forming part of Letters Patent No. 292,466, dated January 29, 1884.

Application filed November 22, 1883. (No model.)

*To all whom it may concern:*

Be it known that I, CHARLES K. BRADFORD, of Lynnfield, in the county of Essex and State of Massachusetts, have invented certain Improvements in Brush-Holder and Tube for Cementing Apparatus, of which the following is a specification.

This invention relates to apparatus for applying rubber cement to the soles of boots and shoes for the purpose of closing the flaps formed in channeling the soles for the reception of the stitches.

In Letters Patent of the United States issued to me May 22, 1883, I have shown a reservoir for cement, a flexible tube connected to said reservoir, and a fountain-brush secured to the outer end of said tube, and adapted to apply the cement flowing from the reservoir through said tube to the sole to be cemented.

My present improvements consist, first, in the provision of a tubular metallic shank or handle holding said brush, and adapted to be attached, as a metal continuation or terminal, to the end of the flexible pipe, and provided with a plug-valve having a thumb-piece adapted to be pressed by the hand that holds the shank, to permit the cement to flow to the brush, and a spring which automatically closes said valve when pressure is removed from its thumb-piece.

The invention also consists in the provision of a tapered or conical end on said shank and a naphtha-proof lining in said tube molded to fit said tapered end, thus preventing the naphtha of the cement from obtaining access to the rubber tube at the point where the shank is secured to the latter, all of which I will now proceed to describe and claim.

The accompanying drawing, forming a part of this specification, represents a longitudinal section of my improved brush-holder and a part of the flexible tube to which the same is attached.

In the drawing, $a$ represents the tubular metal shank, having the brush $b$ at one end, and provided with a plug-valve, $c$, having a thumb-piece, $c'$, and an orifice, $c^2$, adapted to coincide with the conduit of the shank, and permit cement to flow to the brush, as shown in my above-named patent, the valve $c$ being arranged so that the operator can cause the orifice $c^2$ to coincide with the conduit of the shank by pressure of his thumb on thumb-piece $c'$.

In carrying out my invention I provide a spring, $e$, adapted to raise the plug-valve, and thus automatically shut off the flow of cement when pressure is removed from the valve. The operator is thus enabled to control the cement and manipulate the brush with one hand, leaving the other free to manipulate the boot or shoe.

The rubber cement usually employed for cementing the channels of boot and shoe soles is composed of naphtha or other volatile hydrocarbon and rubber. To prevent the hydrocarbon from attacking and destroying the rubber of the tube $f$, which conducts the cement to the brush, I provide said tube with a lining, $f'$, composed of any suitable composition which will resist the destructive action of the hydrocarbon without impairing the flexibility of the tube. Said lining is preferably composed of two parts of gelatine and one part of molasses. This mixture is forced or drawn in a melted condition into the rubber tube around a core placed therein, and when it cools it forms a flexible lining which adheres closely to the rubber tube. The tube projects at its end beyond the lining, so as to present an unlined portion of suitable length to receive the shank $a$. The unlined portion of the tube is secured to the shank by winding a wire or cord around the tube. The end of the shank that projects into the tube $f$ is tapered or conical, as shown, and the end of the lining $f'$ is molded so as to receive and closely fit said tapered portion. This form of the shank and lining affords an elongated bearing of the lining upon the shank, and causes the lining to be pressed closely by the tube $f$ against the shank, so that there is no liability of the hydrocarbon finding its way between the lining and the end of the shank to the rubber tube. The portion of the shank on which the rubber tube bears is provided with peripheral serrations $i$, which prevent the tube from slipping from the shank.

I am aware that it is not new to line a rubber tube with a flexible compound capable of resisting the action of the hydrocarbons; hence I do not claim such lining, broadly.

It will be observed that the tubular metal shank *a* constitutes at once a brush-holder and a naphtha-proof extension or terminal for the rubber tube.

I claim—

1. In a sole-cementing apparatus, the combination of a flexible tube adapted to conduct rubber cement from a reservoir, the tubular metal shank *a*, forming a metallic continuation of said tube, and having a brush, *b*, at its outer end, and a transverse orifice intersecting the conduit through which the cement passes, a plug-valve, *c*, adapted to move in said orifice, and provided with an orifice, *c²*, adapted to coincide with the conduit of the shank when pressed inwardly, and a spring, *e*, whereby the plug-valve is caused to close said conduit when pressure is removed from the plug-valve, as set forth.

2. In a sole-cementing apparatus, the tubular brush-holding metal shank or handle having a tapered or conical end, combined with a rubber tube having a naphtha-proof lining terminating within the tube and molded at its end to receive and closely fit the tapered end of the shank, whereby an extended bearing of the lining on the metal shank is afforded and the cement is prevented from reaching the rubber tube, the end of the rubber tube projecting beyond the molded end of the lining, for attachment to the body of the shank, as set forth.

3. In a sole-cementing apparatus, the combination of a rubber tube having a naphtha-proof lining molded at its outer end, as described, and an inclined portion extending beyond the molded end of the lining, combined with a metallic tubular shank formed to fit the molded end of the lining and the unlined end of the tube, and provided with a brush at its outer end and a valve, whereby the cement may be shut off from the brush, as set forth.

4. The tubular brush-holding metal shank or handle having a tapered end, and peripheral serrations *i i* on a portion adjacent to the tapered end, combined with a rubber tube having a naphtha-proof lining terminating within the tube and molded to fit said tapered end, and an unlined portion extended beyond said molded end and adapted to be secured to the serrated portion of the shank, as set forth.

In testimony whereof I have signed my name to this specification, in the presence of two subscribing witnesses, this 19th day of November, 1883.

CHAS. K. BRADFORD.

Witnesses:
C. F. BROWN,
A. L. WHITE.